June 19, 1956  T. H. THOMPSON  2,751,217
SELF-DAMPED TORSION SPRING
Filed March 31, 1954  2 Sheets-Sheet 1

INVENTOR
TOM H. THOMPSON,

BY Robert B. Pearson
ATTORNEY

June 19, 1956     T. H. THOMPSON     2,751,217
SELF-DAMPED TORSION SPRING
Filed March 31, 1954     2 Sheets-Sheet 2
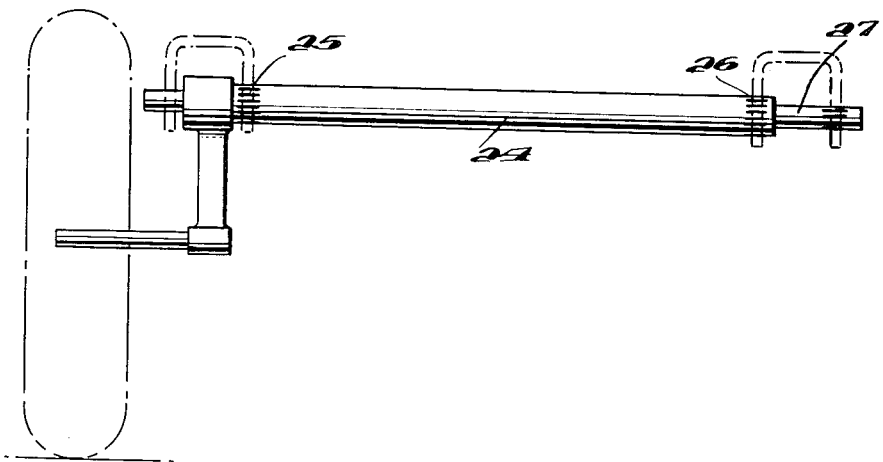
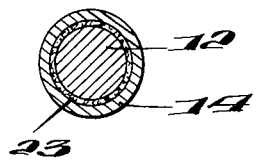
INVENTOR
TOM H. THOMPSON,
BY *Robert B Pearson*
ATTORNEY

United States Patent Office 2,751,217
Patented June 19, 1956

2,751,217
SELF-DAMPED TORSION SPRING

Tom H. Thompson, Daytona Beach, Fla., assignor to Sabre Research Corporation, Daytona Beach, Fla., a corporation of Florida Application March 31, 1954, Serial No. 419,996

12 Claims. (Cl. 267—57)

The present invention relates to a self-damping torsion spring. It is especially useful in a wheel suspension for vehicles such as automobiles and will be so described even though it by no means is limited thereto.

Torsion spring mountings are, of course, well known in the vehicle art. One type of prior art torsion spring employed broadly comprises a torsion rod fixed to the automobile frame at one end and to the wheel crank arm or link at the other end. Such torsion springs have a disadvantage in that they have very little inherent damping of their natural oscillation or vibration. Accordingly, when being used with passenger vehicles, such torsion springs are used in conjunction with shock absorbers so as to eliminate long series of oscillations that would otherwise occur each time a spring had been substantially deflected.

The preferred embodiment of this invention may be employed, for example, in a torsion spring system in which adjacent wheels are independently suspended by means of a trailing link suspension. According to the preferred embodiment a separate torsion spring is used for each wheel, one torsion spring being in the form of a tube, and the other in the form of a rod tightly fitted within the tube. In this manner, self-damping of the torsion springs of adjacent wheels is effected by virtue of frictional engagement of the torsion rod and torsion tube preferably throughout their co-extensive lengths and at least over considerable areas. With such an arrangement, the use of shock absorbers is no longer mandatory, for the usual duration of the periodic vibration of the springs is radically shortened.

In the accompanying drawings:

Fig. 4 is a sectional view along the line 4—4 of Fig. 2; and

Fig. 5 is a front elevational view of a modified form of wheel suspension.

Figure 1:
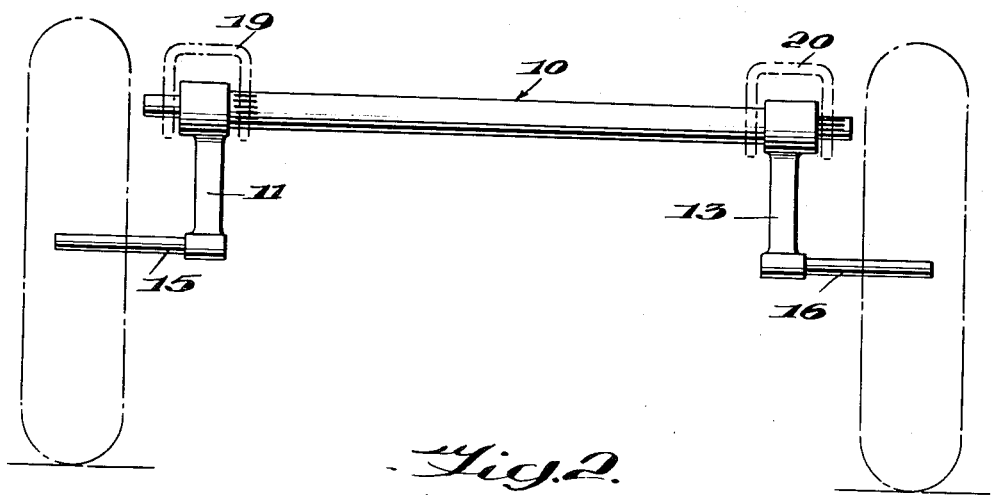
Fig. 1 is a front elevational view of a wheel suspension employing a torsion spring according to this invention.
Figure 2:
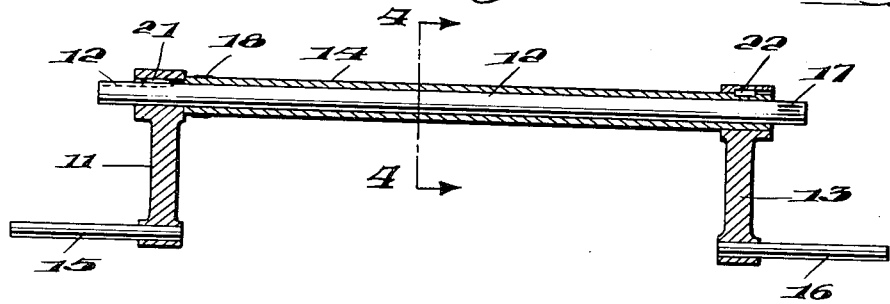
Fig. 2 is a cut-away view of the device shown in Fig. 1, in which the frictional engagement of the mating torsion springs is illustrated.
Figure 3:
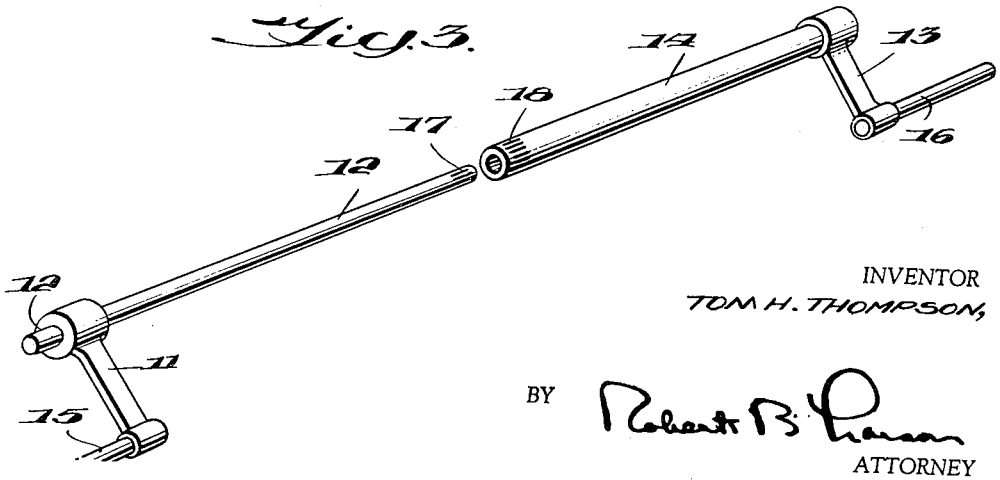
Fig. 3 is a disassembled view of the torsion springs shown in Figs. 1 and 2.

Fig. 1 of the drawing is an illustration of the present invention when being utilized in an independent wheel suspension for non-steerable wheels, such as might be used with a trailer. The invention can be utilized in conjunction with the front wheels of a steerable vehicle, if appropriate members such as steering knuckles or the like were provided to be used with the device shown in Fig. 1. It is shown here only with non-steerable wheels for purposes of simplification.

The self-damped torsion spring suspension is generally illustrated at 10, and essentially comprises a torsion rod 12 that is located inside a torsion tube 14. The torsion rod 12 does not necessarily have to be solid, for it could be a tube. Torsion rod 12, which, as illustrated, is to furnish the spring means for the left wheel of the vehicle, is keyed or otherwise secured as at 21 to link or crank arm 11, which arm contains a wheel axle 15. The other end of the torsion rod 12 that is remote from the arm 11 is equipped with splines 17 or other means that are easily engageable in frame member 20, so as to be restrained against rotation therein.

Similarly, torsion tube 14 is keyed as at 22 one end to a link or crank arm 13, which arm has a wheel axle 16. The other end of the torsion tube 14 remote from the arm 13 is supplied with splines 18 which are readily engageable in similar means in frame member 19, by means of which this end of tube 14 is restrained against rotation. It is, of course, to be understood that the arms 11 and 13 could be integral with their respective torsion members rather than being splined or keyed thereto.

The frame members 19 and 20 can be of any suitable construction such as channel beams in inverted position. Each frame member is adapted to receive both the torsion tube and the torsion rod, for as illustrated in Fig. 1, member 19 receives both the unsplined end of the torsion rod 12 and the splined end of the torsion tube 14. Torsion rod 12 is freely rotatable in the portion of member 19 which it engages, and a pivot is thereby formed about which the left-hand wheel of the vehicle can rotate when, for instance, a bump in the road is encountered. Since the right-hand end of the torsion rod 12 is equipped with splines 17 or the like, that end of the bar is held fixedly in frame member 20. Therefore, upon the left-hand wheel of the vehicle being deflected so that it pivots about frame member 19, the torsion bar rod is subjected to a twisting moment.

In a similar manner, torsion tube 14 furnishes a spring means for the right-hand wheel, the torsion tube being fixed at its left-hand end in frame member 19. The right-hand end of torsion tube 14 being freely rotatable in frame member 20, the right-hand wheel can pivot about frame member 20 whenever the torsion spring 14 is deflected.

According to the invention, torsion rod 12 fits very tightly inside torsion tube 14 so that there is a frictional engagement between the two members. To effect this there should be the close engagement of these two members over considerable areas of the surfaces. This has the effect of damping the oscillations of member 12 or 14 after the wheel associated with a torsion member encounters an obstacle, such as a bump in the road. Were it not for the fact that the two torsion members contact each other over considerable areas, thus resulting in friction capable of effecting damping, each torsion member would oscillate many times for each substantial deflection before it would come to rest in its normal loaded position. However, because of the close tolerances present in this arrangement, a desirable amount of friction is always present to promote damping of the otherwise free oscillations.

Since it is the opposite ends of the self-damped spring suspension 10 that are fixed in the manner described, it is not possible for the two members 12 and 14 to rotate together throughout their lengths. Thus, the oscillations of the torsion members are damped out even though both wheels simultaneously or almost simultaneously encounter the same obstacle lying across the road.

In other words, if the right-hand wheel encountered an obstacle, the arm 13 would rotate in frame member 20, the left-hand end of the tube 14 being restrained against rotation in frame member 19 by the splines 18. This means that tube 14 would undergo a maximum torsional deflection at the location of the arm 13 and zero torsional deflection at the location of the frame member 19. With regard to the torsion rod 12, on the other hand, deflection adjacent the arm 13 is virtually zero, whereas the maximum torsional deflection of torsion rod 12 occurs adjacent the fixed end of torsion tube 14. It is therefore seen that an independent wheel suspension is achieved, as well as a wheel suspension that is automatically damped.

This invention has the added effect of minimizing sway. It is, of course, well known in this art that in a front-wheel suspension that utilizes coil springs, a sway bar is a necessary inclusion in the front wheel suspension if undesirable sway is to be eliminated. Because the present torsion spring wheel suspension is generally in the configuration of a sway bar, a vehicle equipped with such a suspension is afforded a sizable resistance to sway, much more than is present in any other known type of front wheel suspension. In view of the fact that the present invention has such a distinct resistance to the swaying motion necessarily present in a motor vehicle, any provisions for the mounting of wheels on the arms 11 and 13 may be eliminated, and, if desired, the device shown generally at 10 in the drawing may be used in conjunction with, for instance, a coil spring front-wheel suspension. In this event the torsion spring would not be directly responsible for the entire support of the front of the vehicle, but would nonetheless perform a sway bar function.

A similar type of sway bar to that just referred to is to be found in Patent No. 2,083,381, issued to M. R. Hutchison, Jr., on June 8, 1937. In Fig. 6 of that patent, a tubular torsion member 70 is illustrated, which is fixedly connected to a pair of arms generally similar to arms 11 and 13 of the present device. The torsion spring arrangement in accordance with the present invention can be employed advantageously if substituted for the torsion member 70 of the Hutchison patent.

While the present invention is illustrated in connection with wheels directly suspended from the arms of the torsion members, it, of course is to be understood that the present torsion spring system could be used in conjunction with the front wheels of a steerable vehicle, such as the front-wheel suspension of an automobile having the usual front-wheel steering, rear-wheel drive arrangement. In such event, the arms 11 and 13 could directly support a steering knuckle so that the wheels mounted thereon could be turned. Such an arrangement is illustrated in "The Modern Chassis," a book by Hank Elfrink, copyright 1951 by Floyd Clymer. In that publication, Figs. 20 through 22 illustrate a trailing-link front suspension in which steerable front wheels are employed.

The invention extends to or includes the concept of altering or increasing the amount of friction between the two members (such as 12 and 14) by means of providing a friction-producing material 23, Fig. 4, between the members, or constituting one or both of the members or their contacting surfaces, of a friction-producing material. For example, use may be made of metal or alloys thereof and applied to either the rod 12 or the tube 14 such as by plating or other suitable means, or one or both of such members may be comprised wholly of metals or alloys. In accordance with the invention such metals as lead, copper, zinc, cadmium, or chromium or alloys thereof may be used for this purpose, and various combinations of these and others may be employed to effect the desired results. One or the other, or both of such members may be constituted of, or be plated with such metals or alloys, or friction-increasing material may be employed between said members.

Moreover, other friction-producing materials may be employed for this purpose, such as, for example, non-metallic materials, may be employed. The friction may be increased, for example, by use of high friction plastics, or Bakelite or the like, or combinations of such non-metallic material and metallic materials. Thus, for example, one of the members can have a high friction plastic surface while the other can be plated with a metal or alloy, or be formed thereof.

It should be understood that the invention includes a torsion spring arrangement comprising a tube 24, Fig. 5, which is fixedly mounted along its length as at 25 and 26 and a torsion rod 27 inside the tube frictionally engaging the tube and fixed at one end 28; and conversely, a rod fixedly mounted at both ends with a torsion tube surrounding and frictionally engaging the fixed rod. Such an arrangement provides a spring suspension for one wheel only and it is apparent that a similar arrangement would have to be provided for each wheel.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

I claim:

1. A self-damping torsion spring wheel suspension comprising, a vehicle frame, an elongated circular torsion tube fixed at one end to a first side of said frame and freely rotatable at its other end in the second side of said frame, an elongated circular torsion member closely fitted inside said tube and being in frictional engagement therewith for a substantial distance along its length, said torsion member being fixed at one end in said second side of the frame, the other end being freely rotatable in the first side of said frame, wheel supporting links fixedly mounted to the free ends of said tube and said torsion member, and wheels mounted to said links.

2. The wheel suspension as defined in claim 1 in which said wheel supports are of the trailing link type.

3. The wheel suspension as defined in claim 2 in which a friction-producing material is employed between said spring and spring member.

4. A link spring suspension for an automobile having a frame, comprising, an elongated circular torsion tube fixed at one of its ends to said frame, a link being mounted at the other end of said tube, first wheel mounted to said link; and an elongated circular torsion member closely fitted inside said tube and being in frictional engagement therewith for a substantial distance along its length; the end of said torsion member remote from the fixed end of said tube being fixed to said frame, and a second link mounted at the end of the torsion member adjacent the fixed end of said tube and a second wheel mounted to said second link.

5. A link spring suspension as defined in claim 4 in which the spring suspension is located essentially transversely of said automobile.

6. A link spring suspension as defined in claim 4 in which a friction-producing material is employed between said tube and said torsion member.

7. For a vehicle, a combination self-damped torsion spring wheel suspension and sway bar comprising, a vehicle frame, an elongated circular torsion tube located essentially transversely of said vehicle frame and fixed at one end to a first side of said frame the other end of said tube being free; an elongated circular torsion member closely fitted inside said tube and being in frictional engagement therewith for a substantial distance along its length, said torsion member being fixed at one end to the second side of said frame the other end being free; and two link members forming wheel supports, one link member attached to the free end of each of the tube members, and wheels mounted to said link members.

8. The combination wheel suspension and sway bar as defined in claim 7 in which a friction-producing material is employed between said tube and said torsion member.

9. A suspension system for a vehicle having a frame, comprising, a circular torsion tube fixedly mounted at one end to said frame, a wheel suspended from the other end of said torsion member, an inner circular torsion member disposed inside said tube, said inner member being fixed to said frame at its end remote from the fixed end of said tube, and a second wheel suspended from the other end of said inner member, a coating of friction producing material disposed between said tube and said member, said inner member fitting very tightly inside said tube and with a frictional engagement therewith, whereby upon torsional deflection of at least one of said members, a self damping of the natural spring oscillations occurs.

10. A suspension system for a vehicle having a frame, an elongated circular torsion tube, an elongated circular torsion member fitted very tightly inside said tube and being in frictional engagement therewith along substantially the whole tube length, at least one of said members being fixed at both ends to said frame, the other of said members being fixed at one end to said frame and at the other end to a wheel.

11. A suspension system for a vehicle having a frame, an elongated circular torsion tube fixed at both ends to said frame, an elongated circular torsion member fitted very tightly inside said tube and being in frictional engagement with substantially the whole length of said tube, one end of said inner member being fixed to said frame and the other end being mounted to a wheel.

12. A suspension system for a vehicle having a frame, an elongated circular member fixed at both ends to said frame, an elongated circular torsion tube fitting very closely around said circular member and in frictional engagement with said tube along substantially the whole tube length, said tube having one end fixed to said frame and a wheel mounted to the other end of said tube.

References Cited in the file of this patent

UNITED STATES PATENTS

| | | |
|---|---|---|
| 1,221,695 | Dann | Apr. 3, 1917 |
| 1,796,623 | Rodgers | Mar. 17, 1931 |
| 2,075,041 | Kliesrath | Mar. 30, 1937 |
| 2,203,095 | Kreissig et al. | June 4, 1940 |
| 2,220,751 | Bergman | Nov. 5, 1940 |
| 2,438,432 | Edwards | Mar. 23, 1948 |

FOREIGN PATENTS

| | | |
|---|---|---|
| 187,509 | Great Britain | Oct. 26, 1922 |
| 428,173 | Great Britain | May 8, 1935 |